(12) United States Patent
Kaplan et al.

(10) Patent No.: US 11,449,979 B2
(45) Date of Patent: Sep. 20, 2022

(54) MEASURING A PATTERN

(71) Applicant: APPLIED MATERIALS ISRAEL LTD., Rehovot (IL)

(72) Inventors: Vladislav Kaplan, Raanana (IL); Angela Kravtsov, Rama Gan (IL); Shimon Halevi, Kiryat Tivon (IL); Utkarsh Rawat, Dehradun (IN)

(73) Assignee: APPLIED MATERIALS ISRAEL LTD., Rehovot (IL)

(*) Notice: Subject to any disclaimer, the term of this patent is extended or adjusted under 35 U.S.C. 154(b) by 201 days.

(21) Appl. No.: 17/067,566

(22) Filed: Oct. 9, 2020

(65) Prior Publication Data

US 2022/0114721 A1    Apr. 14, 2022

(51) Int. Cl.
G06K 9/00 (2022.01)
G06T 7/00 (2017.01)
G01N 23/2251 (2018.01)
G06T 5/00 (2006.01)

(52) U.S. Cl.
CPC ....... *G06T 7/0006* (2013.01); *G01N 23/2251* (2013.01); *G06T 5/002* (2013.01); *G01N 2223/07* (2013.01); *G01N 2223/401* (2013.01); *G01N 2223/507* (2013.01); *G06T 2207/10061* (2013.01); *G06T 2207/30148* (2013.01)

(58) Field of Classification Search
CPC . G06T 2207/10061; G06T 2207/30148; G06T 5/002; G06T 5/20; G06T 7/0004; G06T 7/0006; G06T 5/003; G06T 5/001; G06T 5/50; G06T 7/0002; G06T 7/60
See application file for complete search history.

(56) References Cited

U.S. PATENT DOCUMENTS

| | | | |
|---|---|---|---|
| 7,324,701 B2* | 1/2008 | Nakami | H04N 1/4092 348/606 |
| 7,660,455 B2* | 2/2010 | Yamamoto | G06V 10/754 382/209 |
| 9,165,376 B2* | 10/2015 | Schwartzband | G06T 5/003 |
| 9,338,426 B2* | 5/2016 | Ishii | G03B 35/08 |
| 10,007,990 B2* | 6/2018 | Mihic | G06T 5/50 |
| 2006/0245636 A1* | 11/2006 | Kitamura | G06K 9/00 382/149 |
| 2010/0061608 A1* | 3/2010 | Galant | G06T 7/11 382/128 |
| 2010/0061650 A1* | 3/2010 | Rai | G06T 5/20 382/264 |

(Continued)

*Primary Examiner* — Avinash Yentrapati
(74) *Attorney, Agent, or Firm* — Kilpatrick Townsend & Stockton LLP

(57) ABSTRACT

There is provided a method, a non-transitory computer readable medium, and a system for measuring a pattern. The method can include (a) obtaining an electron image of an area of a sample, the area comprises the pattern, the electron image comprises multiple lines; each line comprises information obtained by moving an electron beam over a scan line; (b) generating a converted image by applying a noise reduction kernel on the electron image, the noise reduction kernel has a width that represents a number of consecutive lines of the electron image; the width is determined based on relationships between analysis results obtained when using noise reduction kernels of different widths; and (c) analyzing the converted image to provide a pattern measurement.

26 Claims, 7 Drawing Sheets

(56) References Cited

U.S. PATENT DOCUMENTS

| | | | | |
|---|---|---|---|---|
| 2010/0260352 A1* | 10/2010 | Hoshuyama | ....... | H03H 21/0012 |
| | | | | 381/94.2 |
| 2011/0135011 A1* | 6/2011 | Eddy | ....... | G06T 5/002 |
| | | | | 375/240.29 |
| 2012/0057796 A1* | 3/2012 | Kim | ....... | G06T 5/002 |
| | | | | 382/199 |
| 2012/0321157 A1* | 12/2012 | Yang | ....... | G06T 11/008 |
| | | | | 382/218 |
| 2013/0057714 A1* | 3/2013 | Ishii | ....... | H04N 5/23254 |
| | | | | 348/208.4 |
| 2014/0105504 A1* | 4/2014 | Krupka | ....... | G06T 5/002 |
| | | | | 382/195 |
| 2014/0111532 A1* | 4/2014 | Manchi | ....... | G06T 5/003 |
| | | | | 345/582 |
| 2014/0133711 A1* | 5/2014 | Abe | ....... | G06V 40/1347 |
| | | | | 382/115 |
| 2014/0270470 A1* | 9/2014 | Schwartzband | ..... | G06V 20/695 |
| | | | | 382/145 |
| 2015/0110403 A1* | 4/2015 | Cho | ....... | G06K 9/6218 |
| | | | | 382/195 |
| 2015/0110404 A1* | 4/2015 | Cho | ....... | G06T 11/001 |
| | | | | 382/195 |
| 2015/0110415 A1* | 4/2015 | Wang | ....... | G06T 5/003 |
| | | | | 382/255 |
| 2016/0063687 A1* | 3/2016 | Wang | ....... | G06T 5/003 |
| | | | | 382/275 |
| 2016/0343540 A1* | 11/2016 | Nakahira | ....... | H01J 37/22 |
| 2017/0186162 A1* | 6/2017 | Mihic | ....... | G06T 7/0002 |
| 2020/0413069 A1* | 12/2020 | Lim | ....... | H04N 19/593 |
| 2021/0090228 A1* | 3/2021 | Jiang | ....... | G06T 5/002 |
| 2021/0140948 A1* | 5/2021 | Gut | ....... | G01N 33/582 |

\* cited by examiner

MEASURING A PATTERN

TECHNICAL FIELD

The presently disclosed subject matter relates, in general, to the field of examination of a specimen, and more specifically, to image reconstruction.

BACKGROUND OF THE INVENTION

A semiconductor specimen (hereinafter, "specimen") is manufactured by a highly complex manufacturing process.

The specimen can include patterns of sub-micron dimensions, whereas at least one dimension of a sub-micron pattern is below one micron. Pattern edges can deviate from their desired shape. The deviation can be reflected by the roughness of the pattern edge.

The deviation can impact the electrical properties of the pattern and can affect the yield of the manufacturing process.

The deviations can be of sub-micron scale and should be measured accurately. The accuracy is impaired due to noise.

There is a growing need to provide an accurate method for measuring a pattern.

BRIEF SUMMARY OF THE INVENTION

A system, a method, and a non-transitory computer readable medium as illustrated in at least one out of the specification, the drawings, and the claims.

BRIEF DESCRIPTION OF THE DRAWINGS

In order to understand the disclosure and to see how it can be carried out in practice, embodiments will now be described, by way of non-limiting example only, with reference to the accompanying drawings, in which.

DETAILED DESCRIPTION OF THE INVENTION

Figure 1:
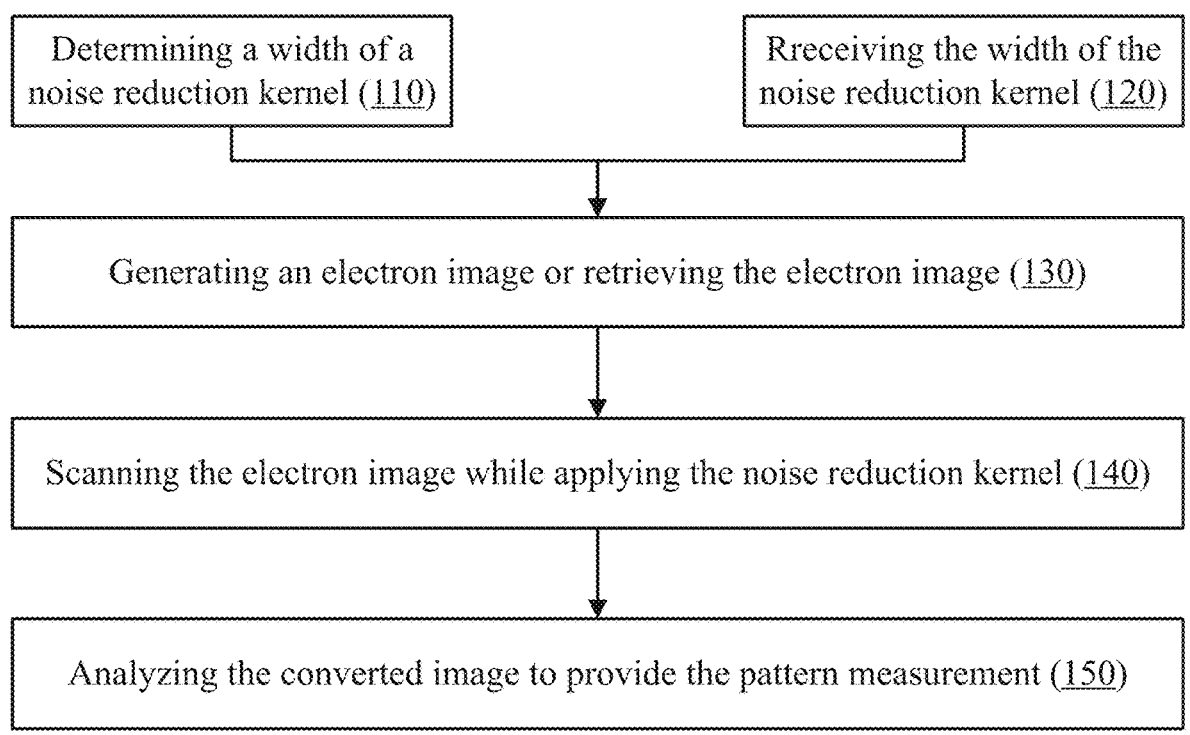
FIG. 1 illustrates an example of a method.

In the following detailed description, numerous specific details are set forth in order to provide a thorough understanding of the disclosure. However, it will be understood by those skilled in the art that the presently disclosed subject matter can be practiced without these specific details. In other instances, well-known methods, procedures, components and circuits have not been described in detail so as not to obscure the presently disclosed subject matter.

In the following detailed description, numerous specific details are set forth in order to provide a thorough understanding of the embodiments of the disclosure.

However, it will be understood by those skilled in the art that the present embodiments of the disclosure can be practiced without these specific details. In other instances, well-known methods, procedures, and components have not been described in detail so as not to obscure the present embodiments of the disclosure.

The subject matter regarded as the embodiments of the disclosure is particularly pointed out and distinctly claimed in the concluding portion of the specification. The embodiments of the disclosure, however, both as to organization and method of operation, together with objects, features, and advantages thereof, can best be understood by reference to the following detailed description when read with the accompanying drawings.

It will be appreciated that for simplicity and clarity of illustration, elements shown in the figures have not necessarily been drawn to scale. For example, the dimensions of some of the elements can be exaggerated relative to other elements for clarity. Further, where considered appropriate, reference numerals may be repeated among the figures to indicate corresponding or analogous elements.

Because the illustrated embodiments of the disclosure can for the most part, be implemented using electronic components and circuits known to those skilled in the art, details will not be explained in any greater extent than that considered necessary as illustrated above, for the understanding and appreciation of the underlying concepts of the present embodiments of the disclosure and in order not to obfuscate or distract from the teachings of the present embodiments of the disclosure.

Any reference in the specification to a method should be applied mutatis mutandis to a system capable of executing the method and should be applied mutatis mutandis to a computer readable medium that is non-transitory and stores instructions for executing the method.

Any reference in the specification to a system should be applied mutatis mutandis to a method that can be executed by the system and should be applied mutatis mutandis to a computer readable medium that is non-transitory and stores instructions executable by the system.

Any reference in the specification to a computer readable medium that is non-transitory should be applied mutatis mutandis to a method that can be applied when executing instructions stored in the computer readable medium and should be applied mutatis mutandis to a system configured to execute the instructions stored in the computer readable medium.

The term "and/or" means additionally or alternatively.

Unless specifically stated otherwise, as apparent from the following discussions, it is appreciated that throughout the specification discussions utilizing terms such as "processing", "obtaining", "selecting", "determining", "generating", "outputting", "using", "performing" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the system and respective parts thereof disclosed in the present application.

The terms "non-transitory memory" and "non-transitory storage medium" used herein should be expansively construed to cover any volatile or non-volatile computer memory suitable to the presently disclosed subject matter.

The term "specimen" used in this specification should be expansively construed to cover any kind of wafer, masks, and other structures, combinations and/or parts thereof used for manufacturing semiconductor integrated circuits, magnetic heads, flat panel displays, and other semiconductor-fabricated articles.

The term "examination" used in this specification should be expansively construed to cover any kind of metrology-related operations as well as operations related to detection and/or classification of defects in a specimen during its fabrication. Examination is provided by using non-destructive examination tools during or after manufacture of the specimen to be examined. By way of non-limiting example, the examination process can include runtime scanning (in a single or in multiple scans), sampling, reviewing, measuring, classifying and/or other operations provided with regard to the specimen or parts thereof using the same or different inspection tools. Likewise, examination can be provided prior to manufacture of the specimen to be examined and can include, for example, generating an examination recipe(s) and/or other setup operations. It is noted that, unless specifically stated otherwise, the term "examination" or its derivatives used in this specification are not limited with respect to resolution or size of an inspection area. A variety of non-destructive examination tools includes, by way of non-limiting example, scanning electron microscopes, atomic force microscopes, optical inspection tools, etc.

FIG. 1 illustrates an example of method 100. Method 100 can start by step 110. Alternatively, method 100 can start by step 120. Step 120 can include receiving the width of the noise reduction kernel. Step 110 can include determining a width of a noise reduction kernel.

The width of the noise reduction kernel is determined based on relationships between analysis results obtained when using noise reduction kernels of different widths. The relationships can be correlations, in which analysis results obtained by using kernels of different widths can be correlated, for example to find when a change in the width of the kernel significantly reduces the quality of measurements of a pattern. Other relationships can be used.

The relationships can indicate what is a kernel width that once applied will not significantly lower the quality of the measurement of the sample. Using a kernel of a width (W) that exceeds one can reduce the number of images of the area that should be acquired (in comparison to the number of images of the area that should be acquired without applying the noise reduction kernel). The reduction in the number of acquired images increases the throughput of the measurement by a factor of W. The reduction in the number of acquired images can also reduce any damage caused to the sample, by reducing the number of images to be acquired in order to obtain an image of desired quality.

It should be noted that method 100 can include only one step of step 110 and step 120, or can include both steps. Steps 110 and 120 can be followed by step 130 of obtaining an electron image of an area of a sample. The area includes the pattern and at least a vicinity of the pattern.

The electron image is generated by following a scan pattern that includes multiple scan lines that intersect with the pattern and/or with a vicinity of the pattern to be measured. At least some of the scan line intersect with the pattern. The electron image includes multiple lines (also referred to electron image line). Each line includes information obtained by moving an electron beam over a scan line. The lines can correspond to columns of pixels of the electron image, to rows of pixels of the electron image or to any other arrangement of pixels of the electron image.

Step 130 can include generating the electron image by a scanning electron microscope or any other charged particle device. Alternatively, step 130 can include retrieving the electron image from a memory unit, and/or from a charged particle device, and the like. Step 130 can be followed by step 140 of generating a converted image by applying a noise reduction kernel on the electron image.

The noise reduction kernel can be an averaging kernel, but any other noise reduction kernel should be applied. Averaging can assist in reducing random noises, especially increasing the signal to noise ratio, but other operations can be applied when the noise differs from a random noise.

The width of the noise reduction kernel represents the number of consecutive lines of the electron image on which the noise reduction kernel is applied. The noise reduction kernel can be a sliding noise reduction kernel that scans the electron image thus performing noise reduction operations on one set of consecutive lines after the other. Any other manner of moving the noise reduction kernel over the image can be applied.

For example, assuming that (a) the lines of the electron image are rows of the image, (b) the noise reduction kernel has a length that equals a length of the rows, and (c) the noise reduction kernel has a width that equals K lines. Under these assumptions, step 140 can include scanning the electron image while applying the noise reduction kernel on K lines at a time.

For example, assuming that there are N lines L(1)-L(N), then the n'th iteration of applying the noise reduction will involve applying the noise reduction kernel on the L(n) till L(n+K-1) to provide a line of the converted image. N is an integer. Index n can range between 1 and N.

Step 140 can be followed by step 150 of analyzing the converted image to provide the pattern measurement. The pattern measurement can include a pattern edge measurement, a measurement of a relationship between pattern edges (for example, a width or a critical dimension of the pattern), and the like.

Figure 2:
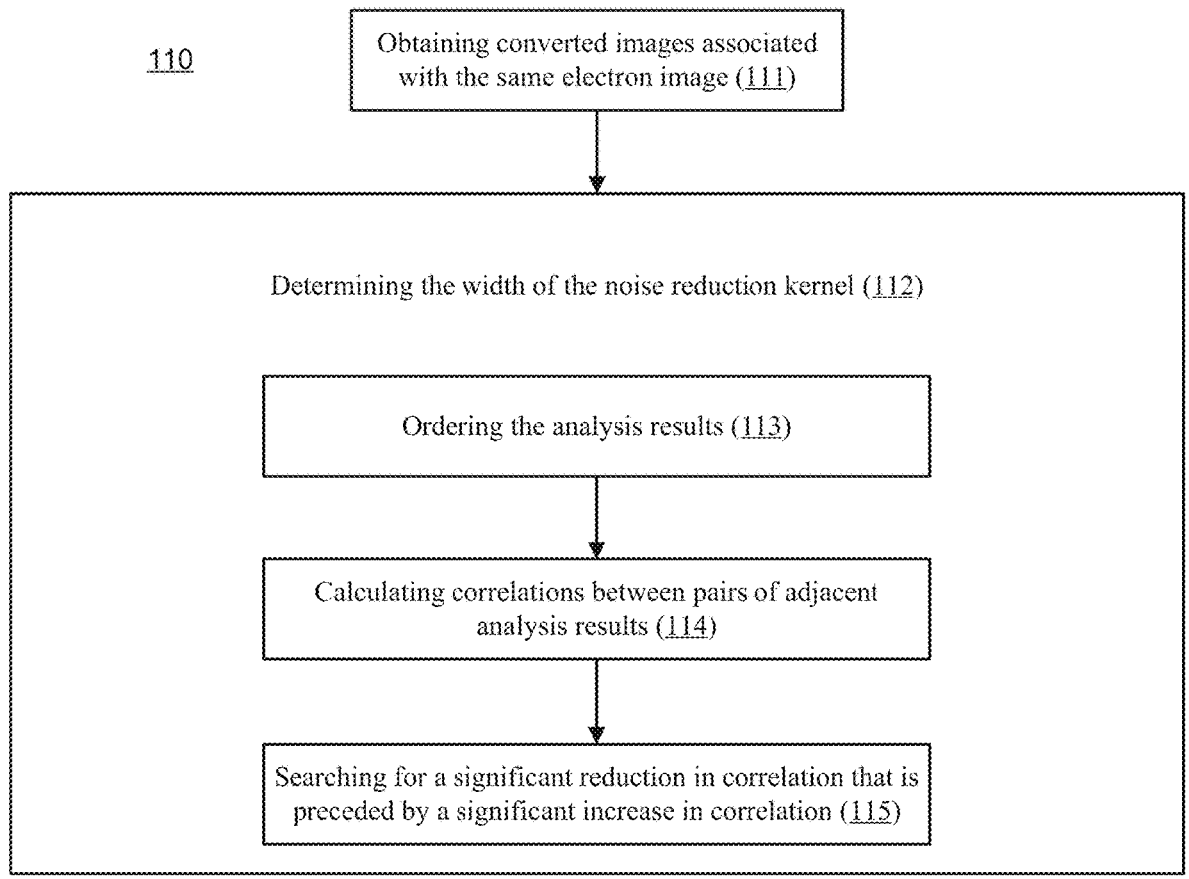
FIG. 2 illustrates an example of a step of the method of FIG. 1.

FIG. 2 illustrates an example of step 110 of determining a width of a noise reduction kernel. Step 110 can include step 111 of obtaining converted images associated with the same electron image. These converted images are generated by applying, on the same electron image, noise reduction kernels of different widths. The same electron image can be the electron image obtained during steps 110 and/or 120 or any other electron image.

Step 111 can be followed by step 112 of determining the width of the noise reduction kernel based on relationships between analysis results obtained when using noise reduction kernels of different widths. The relationships can be correlations, or other relationships. The relationships can indicate what is a maximal kernel width that once applied will not significantly lower the quality of the measurement of the sample. An analysis result can be a power spectrum density or other analysis result.

Step 112 can include a sequence of steps 113, 114 and 115. Step 113 can include ordering the analysis results in an ascending order of width of the noise reduction kernels to provide an ordered arrangement of analysis results. Any other order can be provided.

Step 113 can be followed by step 114 of calculating correlations between pairs of adjacent analysis results of the ordered arrangement of the analysis results. The correlations can be applied on more than two analysis results at a time.

Step 114 can be followed by step 115 of searching for a significant reduction in correlation that is preceded by a significant increase in correlation. What amounts to a significant reduction and to a significant increase can be determined in any manner. For example, a change of more than 10, 20, 30, 40, 50 percent and the like.

Figure 3:
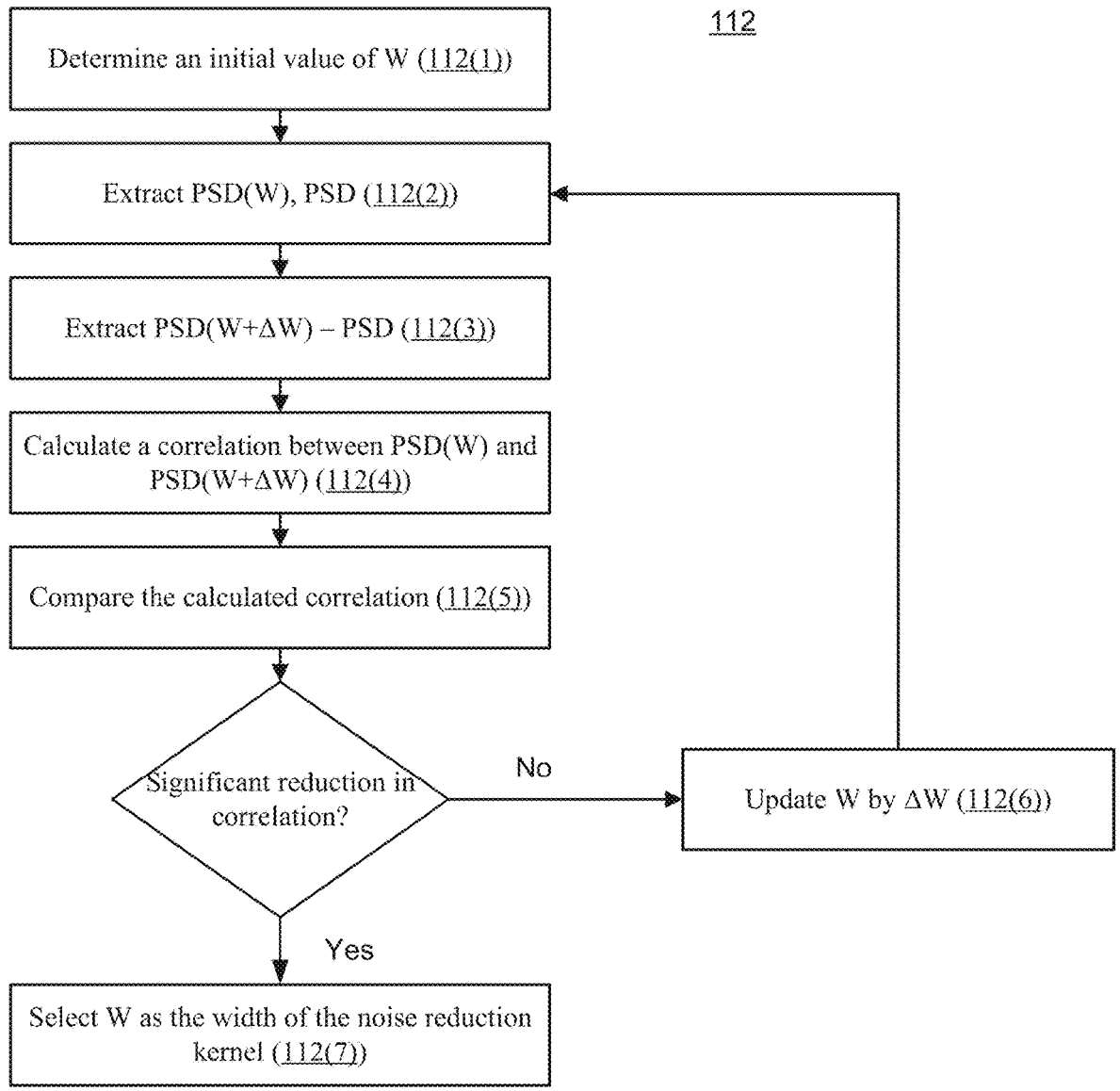
FIG. 3 illustrates an example of a step of the method of FIG. 1.

FIG. 3 illustrates an example of step 112 of determining the width of the noise reduction kernel based on relationships between analysis results obtained when using noise reduction kernels of different widths. Step 112 can include a sequence of step 112(1), 112(2), 112(3), 112(4), and 112(5). Step 112 can also include steps 112(6) and 112(7).

Step 112(1) can include determining an initial value of W, for example, determining a minimal scan averaging possible for power spectral density (PSD) calculation. For example (W=1), W being the width of the noise reduction kernel.

Step 112(2) can include extracting PSD(W), PSD applied on analysis results obtained using a noise reduction kernel of width W.

Step 112(3) can include extracting PSD(W+ΔW)–PSD applied on analysis results obtained using a noise reduction kernel of width (W+ΔW), wherein ΔW can equal one or can exceed one. It is noted that the value of ΔW can change between one iteration of steps 112(2)-112(5) and another iteration of steps 112(2)-112(5)

Step 112(4) can include calculating a correlation between PSD(W) and PSD(W+ΔW).

Step 112(5) include comparing the correlation calculated during the current iteration of steps 112(2)-112(4) and the correlation calculated during the previous iteration of steps 112(2)-112(4). For example, comparing between (a) the correlation between PSD(W+ΔW) and PSD(W) of the current iteration, and (b) the correlation between PSD(W) and PSD(W–ΔW) of the previous iteration).

If no significant change or correlation increased, jump to step 112(6) of updating W by ΔW and jump to step 112(2).

If significant reduction in correlation, then jump to step 112(7) of selecting W as the width of the noise reduction kernel.

It should be noted that any reference to the PSD can be applicable to any part of the PSD—for example applying step 112 only on a part of the spectrum, for example, only on high frequency components of the PSD.

Figure 4:
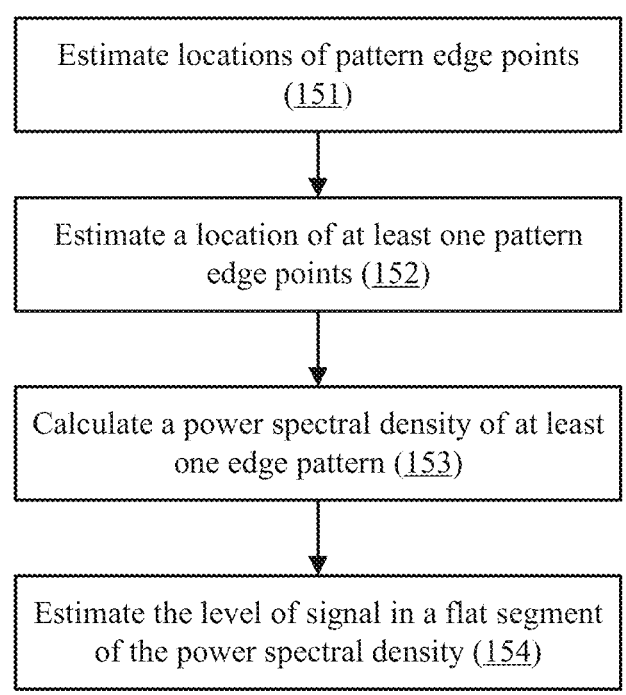
FIG. 4 illustrates an example of a step of the method of FIG. 1.

FIG. 4 illustrates an example of step 150 of analyzing the converted image to provide the pattern measurement. Step 150 can include steps 151, 152, 153 and 154.

Step 151 can include estimating locations of pattern edge points, wherein the estimating is executed without applying a low pass filtering operation. The filtering properties of the low pass filter can be determined based on various parameters such as sampling level and/or interpolation parameters.

Given a line of the converted image, the location of the pattern edge point on the line can be calculated in any manner, for example, based on the values of the pixels along the line, based on the first derivative or a higher derivative of the values of the pixels along the line, and the like.

An example of a location estimation can be based on the first derivative and can be referred to as line edge algorithm (LEA), but should be executed without applying a low pass filter.

An example of a location estimation can be intensity based, can be regarded as intensity threshold algorithm, and can include finding a point that has an intensity that equals a threshold, the threshold can be set to be a certain percent of the values of pixels along the line.

Step 151 can be followed by step 152 of estimating a location of at least one pattern edge points. This can include estimating a pattern edge by a line or a curve based on the locations of the pattern edge point. The estimating can include interpolation, mean square error estimation, extrapolation, and the like.

Step 152 can be followed by step 153 of calculating a power spectral density of at least one edge pattern. Step 153 can be followed by step 154 of performing a stochastic bias noise removal. Step 154 can include estimating the level of signal in a flat segment of the power spectral density and treating the level as a bias signal that also exists in other frequencies of the power spectral density. Step 150 can include calculating statistics of the least one edge pattern instead or in addition to step 154.

Figure 5:
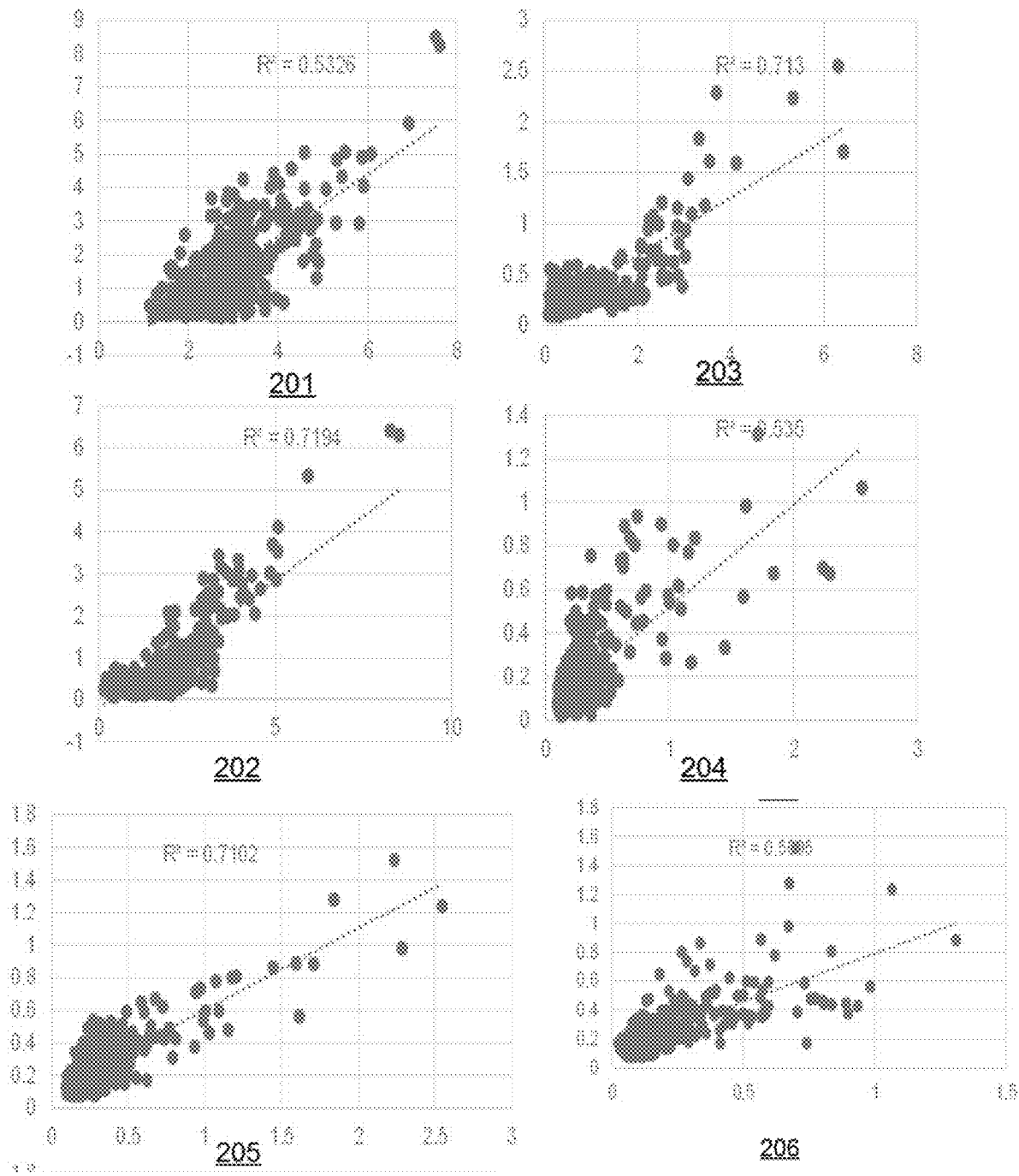
FIG. 5 illustrates an example of correlations between power spectrum densities obtained with noise reduction kernels having different widths.

FIG. 5 illustrates example of correlations between power spectrum densities obtained with noise reduction kernels having widths of 1, 2, 4, 8, 10 and 16.

Graph 201 illustrates the correlation between PSD(1) and PSD(2).

Graph 202 illustrates the correlation between PSD(2) and PSD(4).

Graph 203 illustrates the correlation between PSD(4) and PSD(8).

Graph 204 illustrates the correlation between PSD(8) and PSD(16).

Graph 205 illustrates the correlation between PSD(8) and PSD(10).

Graph 206 illustrates the correlation between PSD(10) and PSD(16).

Figure 6:
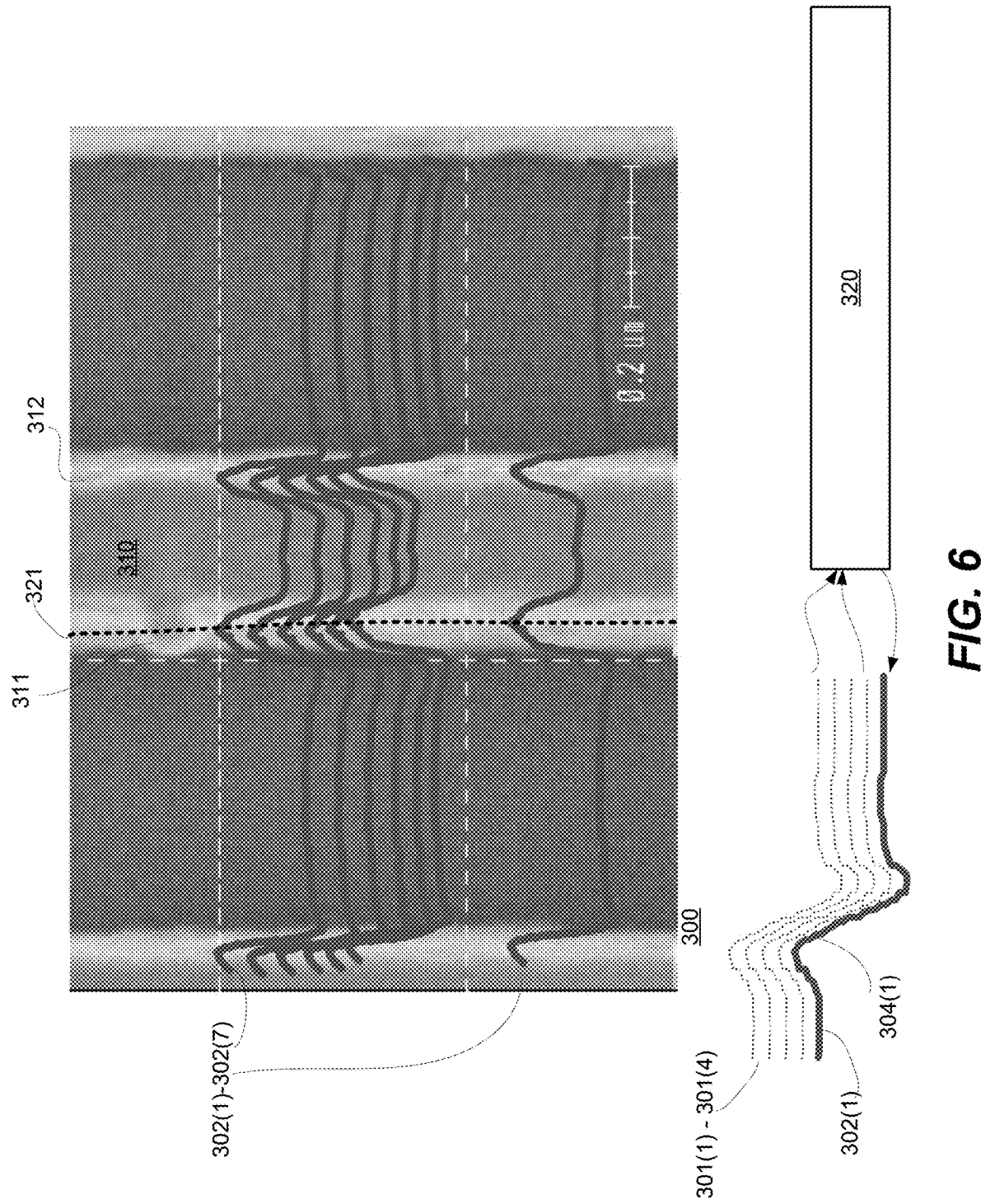
FIG. 6 illustrates examples of an image, image lines, converted image lines, a pattern and an estimation of a left pattern edge.

FIG. 6 illustrates examples of an image 300, image lines 301(1)-301(4), converted image lines 302(1)-302(7), pattern 310, left patter edge 311, right pattern edge 312, and an estimation of left pattern edge 321.

Image 300 is of an area that includes pattern 310 that is a line. The line has a left pattern edge 311 and right pattern edge. The width of the pattern can be distances between left pattern line points and corresponding right pattern line points.

In FIG. 6, W equals four and a noise reduction kernel 320 is applied on four consecutive lines of image 300, for example lines 301(1)-301(4) are converted to provide converted image line 302(1). The converted image line has an edge point 304(1).

It should be noted that adjacent converted image lines form the converted image and just for simplicity of explanation, FIG. 6 illustrate spaced apart converted image lines.

Figure 7:
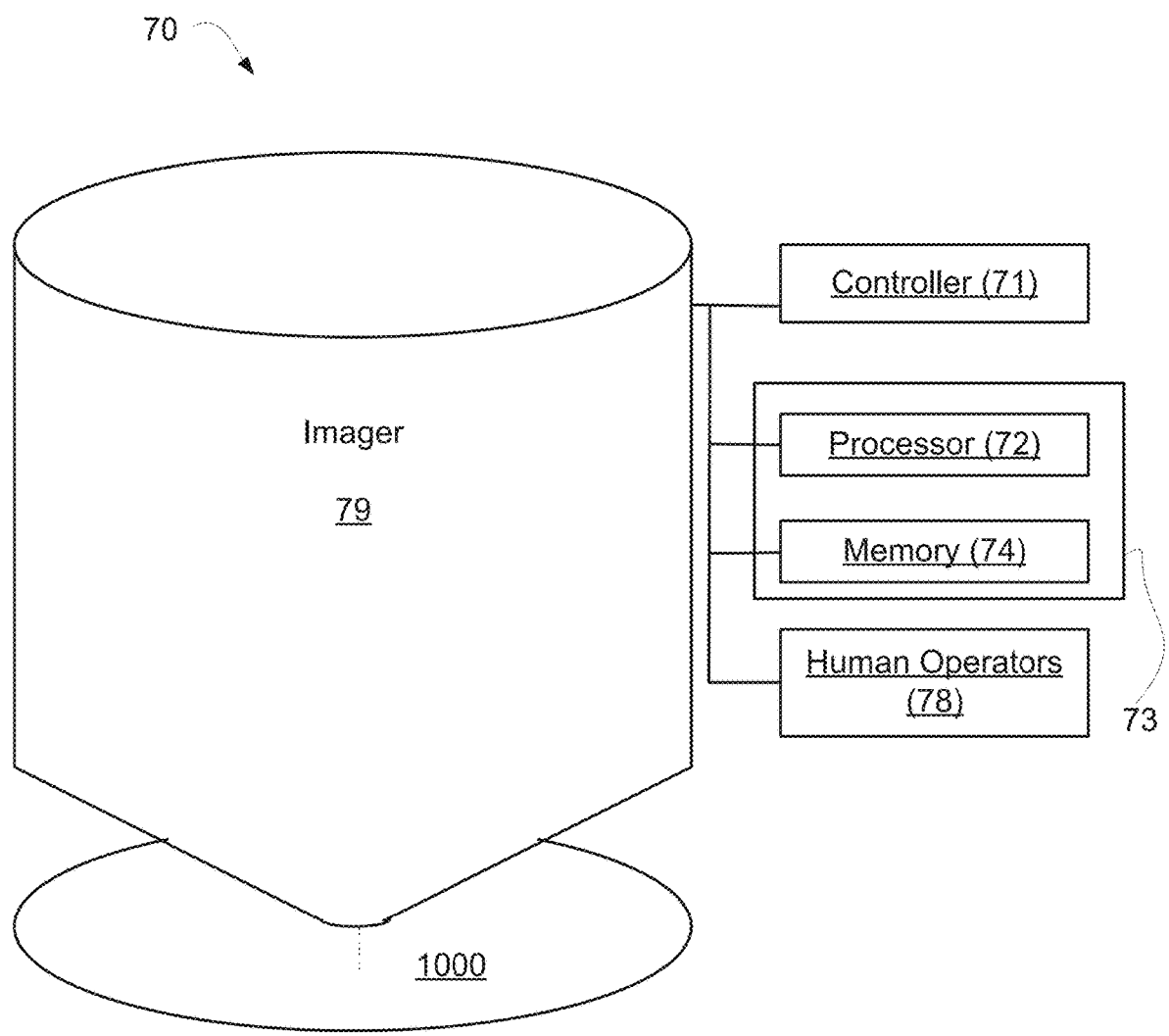
FIG. 7 illustrates an example of a sample and a system.

FIG. 7 illustrates an example of a system 70 and a sample 1000. System 70 can be used for examination of a specimen (e.g. of a wafer and/or parts thereof) as a part of the specimen fabrication process.

System 70 can be configured to communicate with at least one out of other systems, other units, other computerized entities, other memory or storage entities, human operators—collectively denoted 78. The other memory or storage entities can include, for example, memory resources such as a design data server and a data repository.

System 70 can include an imager 79 for acquiring images, controller 71, processor 72, and memory unit 74. The processor and the memory unit can form a processor and memory circuitry (PMC) 73. The imager 79 can include electron optics and any other components and/or units required for generating an image using one or more charged particle beams.

PMC 73 can be part of system 70, can be located outside system 70, and the like. Some of the functionality of the PMC can be implemented by system 70 while another functionality can be executed by memory and computational resources that do not belong to the system 70. For example, a measurement of a pattern can be executed solely by system 70, partially by system 70 or only by memory and computational resources that do not belong to the system 70.

PMC 73 is configured to provide all or at least some of the processing necessary executing any of the mentioned below methods.

Processor 72 can be configured to execute several functional modules in accordance with computer-readable instructions implemented on a non-transitory computer-readable memory of the PMC. Such functional modules are referred to hereinafter as comprised in the PMC. Processor 72 can be or can include any processing circuits—such as a deep neural network (DNN) processor, a graphic processing unit, a general purpose unit, a central processing unit, an accelerator, and the like.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations can be combined into a single operation, a single operation can be distributed in additional operations and operations can be executed at least partially overlapping in time. Moreover, alternative embodiments can include multiple instances of a particular operation, and the order of operations can be altered in various other embodiments.

Also for example, in one embodiment, the illustrated examples can be implemented as circuitry located on a single integrated circuit or within a same device. Alternatively, the examples can be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to embodiments of the disclosure s containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the embodiments of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the embodiments of the disclosure.

Any combination of any module or unit listed in any of the figures, any part of the specification and/or any claims may be provided. Especially any combination of any claimed feature may be provided.

Any reference to the term "comprising" or "having" should be applied mutatis mutandis to "consisting" of "essentially consisting of". For example—a method that comprises certain steps can include additional steps, can be limited to the certain steps or can include additional steps that do not materially affect the basic and novel characteristics of the method—respectively.

The embodiment can also be implemented in a computer program for running on a computer system, at least including code portions for performing steps of a method according to the embodiment when run on a programmable apparatus, such as a computer system or enabling a programmable apparatus to perform functions of a device or system according to the embodiment. The computer program can cause the storage system to allocate disk drives to disk drive groups.

A computer program is a list of instructions such as a particular application program and/or an operating system. The computer program can for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program can be stored internally on a computer program product such as non-transitory computer readable medium. All or some of the computer program can be provided on non-transitory computer readable media permanently, removably or remotely coupled to an information processing system. The non-transitory computer readable media can include, for example and without limitation, any number of the following: magnetic storage media including disk and tape storage media; optical storage media such as compact disk media (e.g., CD ROM, CD R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc. A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system. The computer system can for instance include at least one processing unit, associated memory and a number of input/output (I/O) devices. When executing the computer program, the computer system processes information according to the computer program and produces resultant output information via I/O devices.

The foregoing specification, includes specific examples of one or more embodiments. It will, however, be evident that various modifications and changes can be made therein without departing from the broader spirit and scope of the one or more embodiments as set forth in the appended claims.

What is claimed is:

1. A method of measuring a pattern, the method comprising:
    obtaining an electron image of an area of a sample comprising the pattern, the electron image comprising multiple lines, each line comprising information obtained by moving an electron beam over a scan line;
    generating a converted image by applying a noise reduction kernel on the electron image, the noise reduction kernel having a width that represents a number of consecutive lines of the electron image and that is determined based on relationships between analysis results obtained when using noise reduction kernels of different widths; and
    analyzing the converted image to provide a pattern measurement.

2. The method according to claim 1 wherein the noise reduction kernel is a sliding window noise reduction kernel.

3. The method according to claim 1 wherein the noise reduction kernel is an averaging kernel.

4. The method according to claim 1 comprising determining the width.

5. The method according to claim 4 wherein the determining of the width comprises analyzing converted images associated with a same electron image; wherein different converted images are generated using noise reduction kernels of different widths.

6. The method according to claim 5 wherein the determining comprises:
    ordering the analysis results in an ascending order of width of the noise reduction kernels to provide an ordered arrangement of analysis results; and
    calculating correlations between pairs of adjacent analysis results of the ordered arrangement of the analysis results.

7. The method according to claim 6 wherein the calculating of the correlations is followed by searching for a significant reduction in correlation that is preceded by a significant increase in correlation.

8. The method of claim 1 wherein the analyzing comprises estimating locations of pattern edge points, wherein the estimating is executed without applying a low pass filtering operation.

9. The method according to claim 8 wherein the estimating of the locations is followed by estimating a location of at least one pattern edge.

10. The method according to claim 9 wherein the estimating is followed by calculating a power spectral density of at least one edge pattern.

11. The method according to claim 10 wherein the calculating of the power spectral density is followed by performing stochastic bias noise removal.

12. The method according to claim 1 wherein the noise reduction kernel is a sliding window noise reduction kernel.

13. A non-transitory computer readable medium comprising instructions for:
    obtaining an electron image of an area of a sample comprising a pattern, the electron image comprising multiple lines, each line comprising information obtained by moving an electron beam over a scan line;
    generating a converted image by applying a noise reduction kernel on the electron image, the noise reduction kernel having a width that represents a number of consecutive lines of the electron image and that is determined based on relationships between analysis results obtained when using noise reduction kernels of different widths; and
    analyzing the converted image to provide a pattern measurement.

14. The non-transitory computer readable medium according to claim 13 wherein the noise reduction kernel is a sliding window noise reduction kernel.

15. The non-transitory computer readable medium according to claim 13 wherein the noise reduction kernel is an averaging kernel.

16. The non-transitory computer readable medium according to claim 13 comprising determining the width.

17. The non-transitory computer readable medium according to claim 16 wherein the determining of the width comprises analyzing converted images associated with a same electron image; wherein different converted images are generated using noise reduction kernels of different widths.

18. The non-transitory computer readable medium according to claim 17 wherein the determining comprises:
    ordering the analysis results in an ascending order of width of the noise reduction kernels to provide an ordered arrangement of analysis results; and
    calculating correlations between pairs of adjacent analysis results of the ordered arrangement of the analysis results.

19. The non-transitory computer readable medium according to claim 18 wherein the calculating of the correlations is followed by searching for a significant reduction in correlation that is preceded by a significant increase in correlation.

20. The non-transitory computer readable medium according to claim 13 wherein the analyzing comprises estimating locations of pattern edge points, wherein the estimating is executed without applying a low pass filtering operation.

21. The non-transitory computer readable medium according to claim 20 wherein the estimating of the locations is followed by estimating a location of at least one pattern edge.

22. The non-transitory computer readable medium according to claim 21 wherein the estimating is followed by calculating a power spectral density of at least one edge pattern.

23. The non-transitory computer readable medium according to claim 22 wherein the calculating of the power spectral density is followed by performing stochastic bias noise removal.

24. The non-transitory computer readable medium according to claim 13 wherein the noise reduction kernel is a sliding window noise reduction kernel.

25. A system for pattern measurement comprising a memory unit and a processor, wherein the memory unit is configured to store an electron image of an area of a sample comprising the pattern, the electron image comprising multiple lines, each line comprising information obtained by moving an electron beam over a scan line; wherein the processor is configured to generate a converted image by applying a noise reduction kernel on the electron image, the noise reduction kernel having a width that represents a number of consecutive lines of the electron image and that is determined based on relationships between analysis results obtained when using noise reduction kernels of different widths; and to analyze the converted image to provide a pattern measurement.

26. The system according to claim 25 comprising optics configured to obtain the electron image by, at least, moving the electron beam over multiple scan lines.

* * * * *